United States Patent [19]
Wedeking

[11] Patent Number: 5,419,613
[45] Date of Patent: May 30, 1995

[54] CHAIR-MOUNTED PLATFORM FOR ADJUSTABLY SUPPORT CONTROL DEVICES

[75] Inventor: William B. Wedeking, Ft. Worth, Tex.

[73] Assignee: Wayne L. Corbell, Fort Worth, Tex.

[21] Appl. No.: 767,640

[22] Filed: Sep. 30, 1991

[51] Int. Cl.⁶ .............................................. A47C 7/62
[52] U.S. Cl. .......................... 297/217.1; 297/188.21; 248/160; 248/205.2
[58] Field of Search ................. 297/217, 205.2, 274, 297/160, 104, 217.1, 188; 273/148 B; 108/43, 29; 248/160, 205.2, 176, 345.1

[56] References Cited

U.S. PATENT DOCUMENTS

| | | | |
|---|---|---|---|
| D. 234,592 | 3/1975 | Callaway | D19/88 |
| D. 279,482 | 7/1985 | Ermanski | D19/91 |
| D. 292,150 | 10/1987 | Restin | D6/418 |
| 493,605 | 3/1893 | Tiffany | 297/170 |
| 604,008 | 5/1898 | Hughes | 248/447.2 |
| 1,170,235 | 2/1916 | Fox . | |
| 1,494,212 | 5/1924 | Bromley . | |
| 1,790,500 | 1/1931 | Fischer | 248/160 |
| 1,930,993 | 10/1933 | Blodgett . | |
| 2,111,368 | 3/1938 | Kron . | |
| 2,481,271 | 9/1949 | Willey | 248/160 |
| 2,896,364 | 7/1959 | McCollister | 248/445 |
| 2,976,000 | 3/1961 | Gunderson . | |
| 3,019,709 | 2/1962 | Teason . | |
| 3,335,989 | 8/1967 | Bachmann | 248/176 |
| 3,351,312 | 11/1967 | Ballas . | |
| 3,837,013 | 9/1974 | Davis et al. . | |
| 3,905,573 | 9/1975 | Davis . | |
| 4,023,757 | 5/1977 | Allard et al. | 248/160 |
| 4,494,754 | 1/1985 | Wagner, Jr. | 273/148 B |
| 4,569,498 | 2/1986 | Ermanski | 248/441.1 |
| 4,573,682 | 3/1986 | Mayon | 248/176 |
| 4,842,174 | 6/1989 | Sheppard et al. | 248/160 X |
| 5,035,464 | 7/1991 | Spallholtz | 297/144 |
| 5,135,189 | 8/1992 | Ghazizadeh | 248/160 X |
| 5,154,391 | 10/1992 | Hegorty | 248/205.2 |
| 5,207,791 | 5/1993 | Scherbarth | 273/148 B |

FOREIGN PATENT DOCUMENTS

| | | | |
|---|---|---|---|
| 730558 | 8/1962 | Canada | 248/104 |
| 736364 | 10/1964 | Canada | 248/160 |

OTHER PUBLICATIONS

Game Players Sega Guide, copyright 1992, Family Game Chair.

*Primary Examiner*—Kenneth J. Dorner
*Assistant Examiner*—Cassandra Davis
*Attorney, Agent, or Firm*—Charles W. McHugh

[57] ABSTRACT

An apparatus for supporting a signaling device such as the controller for a video game, comprising: 1) a support member capable of being bent, twisted or otherwise placed into a plurality of positions; 2) a base configured so that it may be affixed to a chair, the base being adapted for connection to one end of the support member; and 3) a platform connected to the other end of the support member. Additionally, it is advantageous to provide some way for ensuring that a signaling device will not slip off the platform. The support member is made of steel or some other sturdy material, and resists compressive loads in a direction parallel to its longitudinal axis. A preferred support member is a so-called flexible tube, which really is a pair of coiled wires that are intimately wrapped together. It is provided with appropriate connectors at each end—to foster easy connection with other elements.

A preferred base is relatively flat and unobtrusive, and is configured so that it can easily be mounted to some structural part of a chair, usually along a frontal surface of a chair's seat. A preferred platform is generally planar, and ideally is relatively thin, having a thickness of one-quarter inch or less; a small platform will typically have a support area of about nine square inches. A fastener of the hook-and-loop type, is used to attach a control device to the top of a platform.

13 Claims, 2 Drawing Sheets

U.S. Patent          May 30, 1995          Sheet 1 of 2          5,419,613
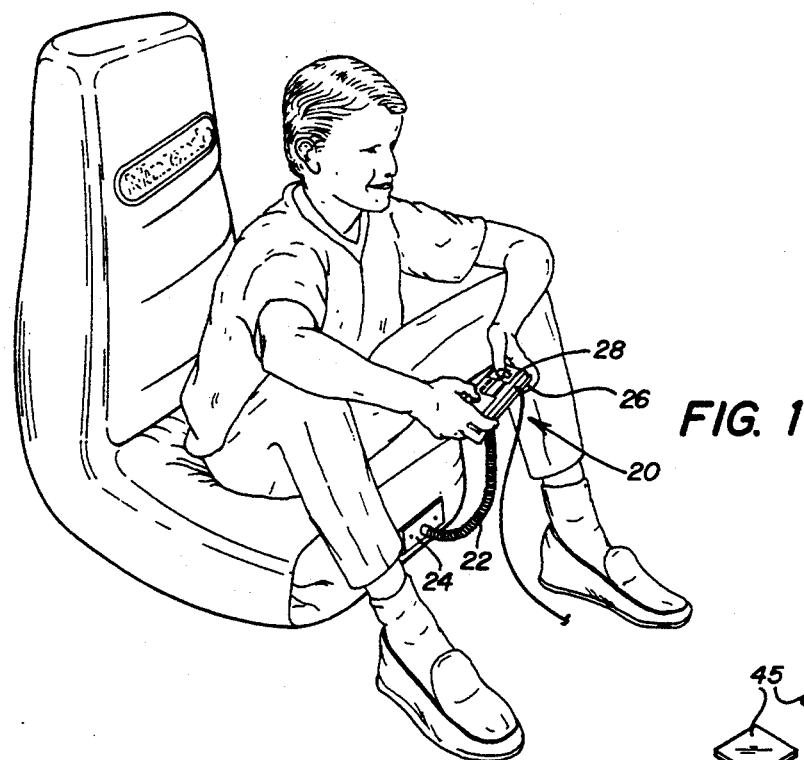
FIG. 1
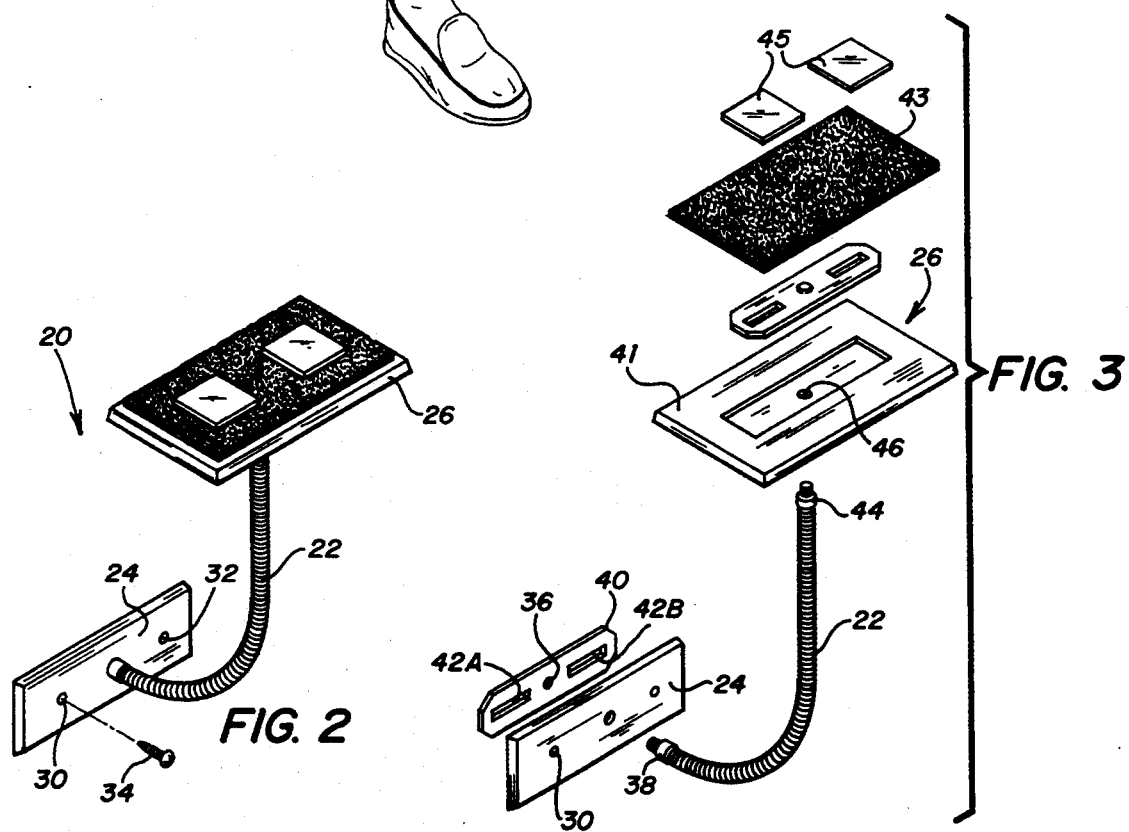
FIG. 2
FIG. 3
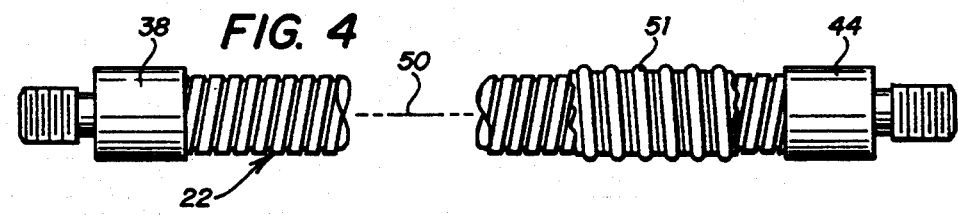
FIG. 4

CHAIR-MOUNTED PLATFORM FOR ADJUSTABLY SUPPORT CONTROL DEVICES

BACKGROUND OF THE INVENTION

The invention relates generally to the support of control devices that are adapted to be manipulated with either one (or both) of a person's hands; more specifically, the invention relates to a small platform that is adapted to be adjustably supported with respect to some structural part of a chair, so that a person sitting in the chair can more comfortably and dependably manipulate a control device (such as a joystick or video controller) that is supported by the platform.

There are many instances in which people are required to handle control devices that send electrical signal to remote instruments and the like. One example of such a device is the controller for a video game, such as one of the games that are sold under the trademark NINTENDO TM. Those familiar with the various NINTENDO TM entertainment systems and similar video games sold by ATARI TM and SEGA TM are aware that a relatively small controller, sometimes also called a control device or control "box", is connected to a main housing for the game's electronics. The electrical connection is usually through a lightweight "umbilical" cord that is several feet long. The electronics for a given game are, in turn, connected to a conventional TV set; and signals generated by the player (using the control device) interact in real time with pre-programmed electronics to affect what is seen on the TV's screen. The typical length of an umbilical cord allows a plater to sit in a chair several feet in front of a TV set and hold a control box while playing a game—using both the video and audio portions of the TV set. Such control boxes are relatively lightweight, usually weighing less than a pound, and are configured to be supported from their bottoms; many persons support the control boxes with their fingers and manipulate the top-mounted switches with their thumbs. Of course, some players of video games have their own personal styles of manipulating switches; but thus far, players have historically learned to play the games by holding the control devices in their hands.

The names ATARI, NINTENDO and SEGA are used herein in the same manner that they are routinely used in commerce. That is, they are used in both a trade name sense (to refer to a company) and is a trademark sense (to refer to one or more products). Of course, double usage of this sort is not unique, because the world has long been exposed to usage of, for example, "IBM"—to refer to a particular company and as a trademark for the company's products.

As video games have become more sophisticated, and as the speed of the games has increased, it has become increasingly difficult to support the control device at the same time that a player is trying to manipulate switches. Therefore, there has arisen a need to improve a player's response-time in trying to play a particular game—by providing some way of physically supporting the control device at a convenient location. In view of the fact that most people will play a video game from a seated position, it would naturally be advantageous to have a supporting platform attached to a chair. And in order to locate the supporting platform so that it is in front of the player, it would be advantageous to position the platform near the front of a chair. Until now, the only chair that could even come close to satisfying the described needs has been the kind of chair that was commonly used in some schools, wherein a platform extends along one side of the chair—at arm level—to provide a wide "writing" platform at the front of the chair. Such a writing platform of the prior art was anchored to the back of the chair with screws and bolts, and a person moved to a sitting position in the chair by sliding into it from the open side. Such chairs with attached platforms (which are also sometimes referred to as writing desks) might be comfortable enough for some persons; but the fact that they are rigid and not adjustable in either an up/down mode or forward/rearward mode means that they would not find universal appeal.

Because players of video games come in all shapes and sizes, including children and adults, male and female, tall and short, etc., it is preferred that a support platform be capable of adjustment so that each person's individual preferences will more likely be satisfied with a single structure. At a minimum, it is desirable that a platform be designed so that it can be moved away from a central position to the right and to the left, as well as forward and backward. It has now been determined that the needs and preferences of most—if not all—video game players can be satisfied by anchoring one end of a flexible member to the front of a chair, and mounting a small platform at the other end of the flexible member. The only parameters that seem to be of major importance are that the flexible member be fabricated in such a way as to give it significant stiffness and strength, and that the member has a sufficient length to foster a range of movement within an are of, say, thirty square inches. Thus, if a platform is designed so that it can be moved within a radius of about three inches from a central position, and the support for the platform is capable of remaining static in spite of the application of torque of at least one-half foot-pound, then the platform can be used to advantage by most persons who are old enough to enjoy video games. It is an object of this invention to satisfy these basic requirements.

It is another object to provide a platform that can be readily attached to a chair—and then removed from the same, without requiring the use of exotic tools and without ruining the general appearance of the chair.

One more object is to provide an apparatus that is capable of being adjusted in size as well as position, in order that a variety of control devices might be supported with respect to any of a variety of chairs.

These and other objects will be apparent from reading the specification that follows, including the claims and with appropriate reference to the drawings attached hereto.

BRIEF DESCRIPTION OF THE FIGURES OF THE DRAWING

FIG. 1 is a perspective view of a video rocker on which one embodiment of an apparatus in accordance with the invention has been mounted;

FIG. 2 is a perspective view of an apparatus like the one shown in FIG. 1;

FIG. 3 is a perspective view of the several parts of an apparatus such as the one shown in FIG. 2, with the parts being separated but arranged in the order that they are subsequently assembled;

FIG. 4 is an elevational view of a flexible tube of the type having utility in an apparatus like that shown in FIG. 1, and including a cross-sectional view of a an exemplary end that has male (or external) threads;

BRIEF DESCRIPTION OF THE INVENTION

Figure 5:
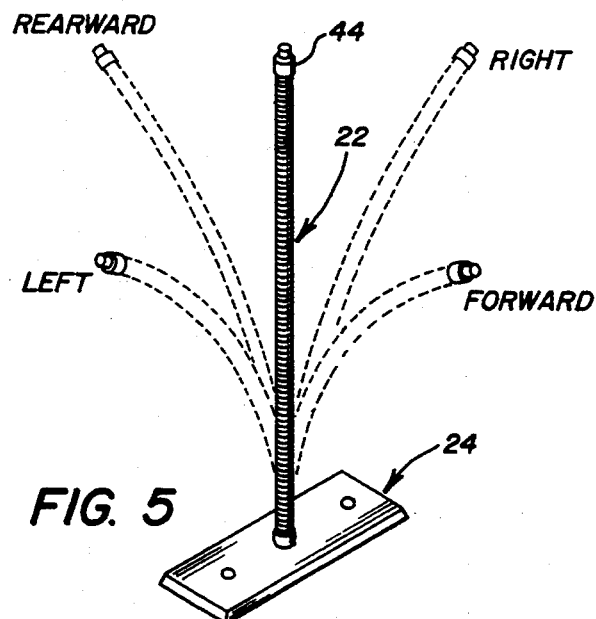
FIG. 5 is a perspective view of a flexible tube attached to a static base, showing how the tube may be bent in order to move a platform to a selected one of a plurality of possible positions.

In brief, the invention comprises three major elements and a method of using them: 1) a support member capable of being bent, twisted or otherwise placed into a plurality of positions; 2) a base configured so that it may be affixed to a chair, said base being adapted for connection to one end of the support member; and 3) a platform connected to the other end of the support member. Additionally, it is advantageous to provide some means for ensuring that a control device will not slip off the top of the platform.

The support member is characterized by having substantial strength, and ideally is made of steel or some other sturdy material, and is capable of resisting compressive loads in a direction parallel to the longitudinal axis of the support member. A preferred embodiment of a support member is a so-called flexible tube, which really is a pair of coiled wires that are intimately wrapped together. One of the wires is shaped in the manner of a tightly wrapped coil spring, said "spring" having a diameter of about one-half inch, and the coils having a pitch of about one-eighth inch. The second wire is tightly wrapped in a coiled manner around the first wire, and positioned so that the second wire is essentially wedged between adjacent coils of the first wire. While there is only a mechanical fit between the two coiled wires, they are held together so tightly that, in combination, they are essentially water-tight. That is, most flexible tubes can convey water—internally—without losing a drop as a result of leakage between the adjacent wires. And as a result of tension in the second wire and friction between the first and second wires, the second wire will hold the first wire in essentially any of an almost infinite number of positions into which the first wire has been bent. Such a flexible tube is preferably provided with appropriate connectors at each end—to foster easy connection with other elements of the combination; male-type threaded members constitute the preferred connectors.

The base is preferably relatively flat and unobtrusive, and is configured so that it can easily be mounted to some structural part of a chair. In the preferred embodiment, the base is mounted along a frontal surface of a chair's seat, and it is positioned centrally of the seat, such that it lies in a vertical plane through the center of the chair. When the base is installed in this manner, a person's legs will usually lie on either side of the base, so that the flexible tube (which will protrude outwardly from the base) will be straddled by a person's legs—in the same manner that a rider's legs typically straddle a horse. Also, in the same manner that a center of gravity of some body is identified, a point on the platform may be identified as being the point through which "action" forces are concentrated by someone playing a video game. When the base is installed on the front of a chair, it will be more likely that this "action" point on the platform will lie close to a vertical line through the point at which the flexible tube is connected to the base.

The preferred platform is generally planar, and ideally is relatively thin, having a thickness of one-quarter inch or less; a small platform will typically have a support area of about nine square inches, and larger platforms may have a support area of about fifteen to twenty square inches. The most common platform will usually be configured to underlie and support the control device of a video game. Because many video control devices are generally rectangular, a typical platform will be similarly rectangular, having a length of about two inches and a width of about five inches.

The preferred means for attaching a control device to the top of a platform constitutes a fastener of the hook-and-loop type, such as one of the thin fasteners that is widely sold under the brand name VELCRO ™. By gluing the hook portion of such a fastener to the top surface of the platform, and gluing the loop portion to the bottom surface of a control device, the control device may be readily oriented with respect to the platform—and connected and removed at the pleasure of a player. The loop material is soft, and it would not be uncomfortable to touch even if a player chose to hold the controller and temporarily set the platform aside. However, the hook portion of a VELCRO ™ fastener is more expensive than the loop or pile portion. So, covering at least most of the platform with loops and putting small patches of hook material on the controller is more economical. With such a fastener, a control device may be quickly restored to its supported position on a platform by merely pressing hooks and loops together so that they will interconnect in a well-known manner.

DETAILED DESCRIPTION OF A PREFERRED EMBODIMENT OF THE INVENTION

Referring initially to FIG. 1, a leg-less rocker of the type commonly sold as a "video chair" is shown with its front oriented toward the viewer. Mounted on the front of the chair is an apparatus 20 in accordance with this invention, the apparatus being mounted on some structural part of the chair, usually at a level below the surface on which a person would routinely sit. The apparatus 20 includes a flexible tube 22 which is connected at one end to a base 24 (which, in FIG. 1, is oriented in a generally vertical direction), and connected at its other end to a platform 26. On the top surface of the platform 26 is mounted a control device 28 for a video game or the like.

Referring additionally to FIG. 2, which is a perspective view of the exemplary apparatus 20, the base 24 is generally flat and relatively thin, e.g., about one-fourth inch thick, so that it will not protrude forwardly of a chair in an obtrusive manner. The thin appearance of the base 24 is particularly significant when the tube 22 is made in such a way as to be selectively removable from the base. That is, the apparatus 20 is preferably separable into at least two parts when it is not in use. One of these two parts is the base 24, which may be permanently affixed to the front of a chair; it may be thought of as a static part of the assembly. The other one of the two parts, which may be thought of as the movable part, is the combination of the tube 22 and the platform 26. When the parts are separated, it is desirable that the chair be essentially as functional and attractive as it was before the base 24 was installed. And leaving the base 24 permanently attached to a chair, even when the tube 22 and platform 26 are temporarily removed, constitutes the preferred manner of using the apparatus 20.

Alternatively, the base may form an integral part of a spring clip that attaches temporarily to a structural part of a chair—such as an exposed edge of a chair's frame. Such a clip-on construction would, of course, be more likely to be used as a part of an after-market item that is installed and removed (as required) by a retail customer, rather than an O.E.M. part that is at least partially installed by a furniture manufacturer.

The base 24 has first and second apertures 30, 32 that are widely spaced and located near opposite sides of the base. The apertures extend through the base and are sized to receive mechanical fasteners such as wood screws or sheet metal screws (e.g., screw 34). Visible in the arrangement of pats in FIG. 3 is a central bore 36 that is oriented to receive the first end of flexible tube 22. This first end of tube 22, hereinafter referred to as proximal end 38, has external (or male) threads that are configured to mate with internal threads in bore 36. After a base 24 has been properly affixed to a chair with mechanical fasteners, a tube 22 may be selectively connected to the base by engaging the complementary threads on end 38 and bore 36. When those threads are engaged, the apparatus 20 may be used as intended; or the tube 22 may be unscrewed and stowed in a desk or the like, thereby returning the video rocker to a configuration that is essentially the same as a conventional video rocker.

In the preferred embodiment, the base 24 is composed of a combination of metallic and plastic members. As seen in FIG. 3, a generally rectangular metal plate 40 is provided—for strength in anchoring the apparatus to a chair. A suitable metal plate 40 is about 4 inches long and about ¾ inch wide. The outer or plastic member may be made of a thermosetting plastic, which can be relatively weak—in comparison to the metal part. Two spaced apertures or slots 42A, 42B are provided in the metal plate 40 at locations so that they may be aligned with the aforementioned apertures 30, 32. In the center of the plate 40 is provided the threaded bore 36. If the threads of bore 36 are configured as conventional threads, e.g., ⅜-24 threads, then the threaded bore can receive the male ends that are available as standard items from Vermont Flexible Tubing Co., Inc. of Lyndonville, Vt. Of course, special threads could also be obtained on the bore 36 and the tube 22, if the expense of a custom design seems to be justified. But there is no magic in the bore threads, per se, as long as they are compatible with whatever threads are on the ends of tube 22.

At the second end of the tube 22, hereinafter referred to as the distal end 44, are provided external threads that will engage a bore in platform 26. The threads on distal end 44 are preferably the same as those on proximal end 38, so that the tube 22 may be connected to the other parts without regard to its orientation. The bore 46 in the platform 26 is centrally located to receive the male threads on distal end 44. Placing the bore 46 in the center of a platform 26 will make it easier for a player to rely on the platform boundaries to locate a control device 28, so that it will be essentially balanced with respect to the supporting tube 22. But placing the bore 46 at some other position with respect to the platform would obviously fall with the broad scope of this invention.

By forming the flexible tube 22 of a sturdy material, e.g., steel, it will have structural characteristics such that a significant force may be applied along the longitudinal axis of the tube—represented by line 50 in FIG. 4. A preferred material for at least most of the tube 22 is high carbon steel, which is configured in such a way that its external surface is smooth, in order to minimize the change that someone might grab the tube and be startled by discovering a rough or sharp edge. It is also possible to envelop a steel tube 22 with a plastic sheath having an exterior surface that feels relatively smooth, which can make the combination aesthetically pleasing as well as providing protection against any possible contact between skin and a metal burr that may be inadvertently present on the steel tube. Such a tubular sheath is represented by the segment 51 shown in FIG. 4. A preferred length for the tube is about 15 inches, but a range of about 12 inches to 20 inches may be acceptable for certain chairs (such as wheelchairs).

The desired flexibility of a preferred tube 22 is represented in FIG. 5, where the option of bending the tube to either the right or the left is illustrated. FIG. 5 also illustrates, with broken lines, that the tube 22 can be bent with respect to a fixed base in order to be positioned rearwardly (toward a player who is seated in the chair) or forwardly (away from the chair). In a sense, the flexible nature of the tube 22 permits the apparatus to be selectively adjustable in order to fit the particular desires or requirements of an individual player who may be a child (and have short arms) or an adult (with long arms), etc. Hence, if a flexible tube 22 has a length of about 15 inches, then the platform 26 may be moved with respect to a fixed chair in an arc whose radius is about 15 inches.

The ability to bend the flexible tube 22 right or left also gives a player the option of choosing an optimum angle for orienting a video control device that is attached to the top surface of the platform 26. No double this feature can reduce the strain that might otherwise occur from holding a control device in a single position and operating switches or a joystick for an extended period of time—perhaps even hours. And it is believed that there are many parents who could affirm that their children would be willing to continuously play NINTENDO TM games for many hours, if permitted to do so.

The superficial appearance of the flexible tube 22 may remind some observers of a few places where certain types of flexible tubing have been commercially used. First, a certain kind of metal-type flexible tubing has been widely used to connect telephone handsets to the main housing of pay phones that have been "armored" to protect wires against vandalism and the like. But those persons who have actually used such pay phones will perhaps remember the remarkable flexibility of the protective tubing, and recognize that such tubing would not be serviceable—at least by itself—as a static support for a platform 26. Another type of flexible tubing is found in many bathrooms that have shower facilities—where flexible tubing is used to connect a water supply pipe to a hand-held shower head. Such a tube is illustrated in U.S. Pat. No. 3,837,013 entitled "Movable Shower Head And Soap Tray Assembly" which issued to Davis and Jones on Sep. 24, 1974. But as with pay phones, the metallic flexible tubing found in so-called shower massagers and the like would be much too limber to support a platform 26.

Another kind of flexible tubing can be found in old-fashion "goose-neck" lamps that were common on student desks many years ago, before such lamps were replaced with more modern styles. The concept of supporting a lamp head with a flexible tube has been in existence for over a hundred years, as indicated by U.S. Pat. No. 472,611 entitled "Flexible Supporting Arm For Electric Lamps" dated Apr. 12, 1892. Another lamp support is shown in U.S. Pat. No. 1,170,235 to Fox entitled "Adjustable Lamp Support." But while the appearance of tube 22 might remind someone of a lamp with a flexible tube, the structural features of a lamp may be quite different. It should be remembered that lamps with flexible necks are expected to operate only against gravity—to support the combination of a lamp socket, a bulb, and a shield (or cover) in some fixed position that has been selected by the user. So flexible necks for lamps are basically passive; and if lamp necks are moved to some new position, they are simply expected to stay there and not "droop." Lamp necks are not expected to resist dynamic loads, such as those that would occur if an excited player were to be alternately pushing and pulling on the housing of a video controller.

Similarly, a flexible "arm" or "neck" that is used to hold a microphone for an after-dinner speaker is a passive support that does nothing but hold a microphone in a selected position, so that a speaker (whatever his or her height) may be heard—through an amplifier—in the back of a large room. Still another passive supporting construction may be seen in U.S. Pat. No. 2,111,368 to Korn entitled "Tilting Camera Support" which issued Mar. 15, 1938. Obviously, people do not abuse their cameras by beating on them, and the flexible tube shown in the Korn patent could expect to have a rather tranquil existence—in comparison with the flexible tubes contemplated for use with video games.

Figure 6:
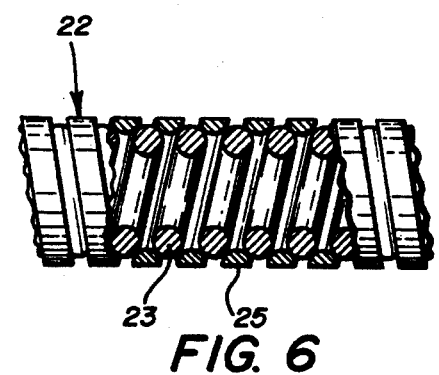
FIG. 6 is a fragmentary elevational view of an exemplary piece of flexible tubing, with part of the exterior broken away to reveal the spatial relationship of the two metal wires that give the tube its characteristic qualities.

The preferred flexible tube 22 of this invention is sufficiently stiff to resist a series of dynamic loads of the type that can be expected from energetic players of video games. At a minimum, the flexible tube 22 should be able to resist a significant transverse load before bending, with a traverse load being understood to be one that is applied perpendicularly to the tube at one end while the other end is being held fixed. This is also one way of measuring the resistance of the tube 22 to torque; and using this technique, a person may test any given tube to see if it is stiff enough to provide the kind of support that is needed to hold a video game in an operative position. At a minimum, a tube should be able to resist a torque of about six inch-pounds; and the preferred tube has a stiffness that is sufficient to resist a torque of about two foot-pounds. Tubes having a stiffness sufficient to resist a displacing torque of up to four foot-pounds are probably not uncomfortably stiff for teenagers having ordinary strength in their arms and hands; but such a stiffness may be too much for pre-kindergarten children to handle easily. It is believed that an optimum range for tube stiffness is about one-half foot-pound of torque (to effect displacement) up to about five foot-pounds. When the first wire of a flexible tube 22 is made of high carbon steel having a diameter of about 0.10 inch, and the second wire (of soft drawn steel) is tightly wrapped around the first one before the connectors are affixed to the ends, the stiffness realized from the combined wires can be stiff enough to hold a platform against dynamic loads without creating a safety hazard if someone should bump into a protruding tube. A first wire 23 is shown in FIG. 6 where it is wrapped tightly by a second wire 25 in a known manner.

One reason that there is a maximum stiffness for the tube 22 (i.e., about four or five foot-pounds of torque) is the recognition that some children may forget to remove a protruding tube from the front of a chair—when the time has come to quit playing a video game. Hence, when a player abandons a chair but leaves the apparatus 20 installed, there is a small risk that someone else may come by and bump against a protruding platform 26. Even worse, there may be instances when two or more children are engaged in some semi-rough play in a room, and one of them accidentally falls or is pushed onto an extended platform 26. If the flexible tube 22 has a stiffness such that it can resist more than 5 foot-pounds of torque, then the tube might not yield as quickly as might be desired, and the child could find contact with the platform to be rather uncomfortable. Of course, including a break-away mount on the base 24 could avoid the adverse consequences of bumping into a tube that is too stiff; but it is simpler to just make the tube 22 sufficiently flexible that it will bend if and when a child falls against an extended platform 26.

A continued study of the preferred embodiment of this invention may bring to mind still another product which can be called a type of flexible tubing, namely, the metallic tubing which is used as conduit for electrical wiring on some machinery and in many commercial building and the like. But while such flexible conduit might bear a superficial resemblance to the tube 22, it would not likely be someone's first choice for a structural support—because electrical conduit is not designed to take compression loads. And the ability to resist compression loads is ancillary to the ability to resist torque loading—which is a significant consideration in selecting a proper tube 22. Electrical conduit is intended to be a passive shield that surrounds electrical conductors and provides armored protection against contact with anything that might create an electrical short, etc. In fact, taking apart a section of flexible electrical conduit will reveal that it is like a one-piece ribbon of metal that has a generally S-shaped cross-section, as seen in a transverse view. The metal ribbon is wrapped in a series of side-by-side coils, so that the forwardly facing portion of a given coil is engaged with the rearwardly facing section of the immediately adjacent coil. The series of engaged coils give the conduit good flexibility, but some kind of structural core would have to be added in order to render electrical conduit serviceable as part of a support structure for a platform 26. It may be accurately said, then, that it would not be obvious to use something to support a platform just because it happened to look like tube 22.

Referring again to FIG. 4, a cross-sectional view of a preferred connector is shown at the left side of the drawing. Such a connector may be swedged (or crimped) onto the ends of a tube 22 in order to maintain the two wire that make up the tube in satisfactory contact. Thus, the connectors render the tube 22 serviceable, and their threaded ends also make it possible to selectively disengage a tube from a fixed base 24. A finger-tight fit is all that is required with the threaded connectors, so no wrenches or exotic tools are needed to effect or release a serviceable connection. A tube 22 and its attached platform 26 may also be removed from a chair at any desired time, thereby restoring the chair to nearly its original appearance. If desired, a first platform 26 may be removed from the distal end of a tube and replaced with a second platform. Replacement would likely be done if the area or shape of the second platform is different from the first—and the second one more nearly matches the configuration of a new controller that a player wants to use.

To facilitate the step of mounting a video control device on the top surface of the platform 26, it is preferred that a significant portion of the top surface be covered with the hook portion of a VELCRO TM fastener. Indeed, covering the entire top surface (as shown in FIG. 2) is preferred—for two reasons. First, covering the entire top surface is more cosmetically pleasing, because the surface looks uniform. A complete cover of material 43 will also hide the fact that a platform of plastic material has been internally reinforced with a metallic member. Second, covering most—if not all—of the entire surface of the platform will increase the area that is available for engaging an appreciable quantity of the complementary elements 45 that are secured to the bottom of a video control unit. Thus, if the area of the top surface 41 of a platform 40 is approximately fifteen square inches (based upon a rectangular platform having a width of about five inches and a height of about three inches), and if that area is covered with one half of a hook/loop fastener, there will be ample opportunity to affix a control device at a variety of places on the platform 26. By virtue of using VELCRO TM mechanically interlocking fabric, it may even be possible to secure a control device to a platform in such a way that the control device extends beyond the periphery of the platform by one or more inches.

Figure 7A:
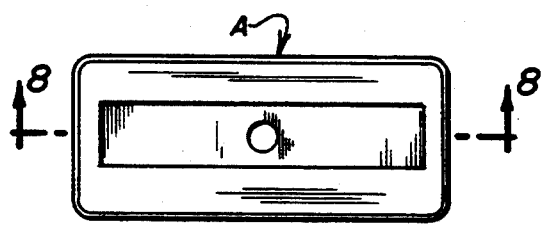
FIGS. 7A, 7B and 7C are top plan views of exemplary platforms, showing how the width and height dimensions are measured.

There are at least three major shapes for the platform 26 that will likely be of interest to players of video games that are now commercially available. Regardless of shape, all of the platform sizes will be relatively small in comparison to the size of a chair for supporting a human. The first shape, which will be designated herein as shape A, is a rectangle having a width of about 4¼ inches and a height of 2 inches; its thickness is about one-fourth inch. Shape A, shown in FIG. 7A is capable of engaging and supporting what may be called "small" video controllers, including the JOYCARD TM (by NINTENDO TM), the PYTHON TM (by SEGA TM), and the TAC 50 TM (by SEGA TM). A small platform 26 can often be used to support a large controller, as long as it has a flat bottom. The converse is not always true, however, because the excessive length of width of a "wide" platform might interfere with a player's ability to easily reach the switches on the controller.

Figure 7B:
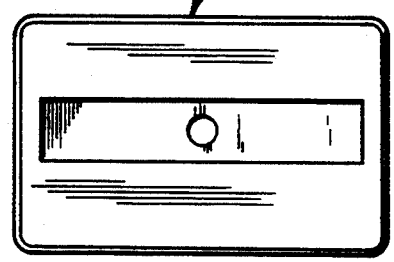

The second major shape for a platform 26 is a rectangle having a width of about 5 inches and a height of about 3 inches. This second platform will be referred to herein as shape B, and is shown in FIG. 7B. This shape is a bit larger than that of shape A, and is ideally suited to hold a variety of controllers, including the LYNX TM (by ATARI TM), and the following controllers by NINTENDO: ZOOMER, ULTIMATE, TURBO TAP, DOUBLE PLAYER, TURBO STICK COMPETITION PRO, ADVANTAGE, AND FREEDOM STICK. A characteristic of platforms in accordance with shape B is that they can provide support by fully contacting the flat bottom surface of a controller—or by becoming wedged between the downwardly protruding vacuum cups that are provided on some controllers. That is, the smooth, unobstructed top surface of a platform provides no obstacle to contact with a flat-bottomed controller. And the absence of any irregularity on the platform top also ensures that such a platform can be inserted sideways into a suitable space. The height dimension of a platform with shape B has been established so that the platform may be slipped into the gap between the front and rear rows of suction cups on some controllers. When used in this manner the suction cups would not be used as originally intended, but the cups would constitute structural elements that would hold a platform 26 with sufficient tightness as to render the controller "captured" for support purposes.

Figure 7C:
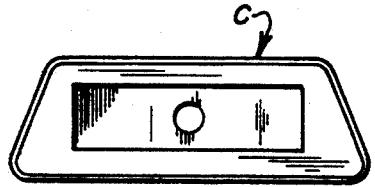

Another platform, identified as shape C, may also be used to support a control device that may be described as boat-shaped. The MAX controller offered by NINTENDO TM will fit nicely on a platform having the C shape. The C-shaped platform is shown in FIG. 7C.

Figure 8:
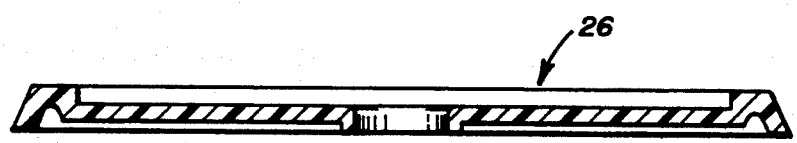
FIG. 8 is a cross-sectional elevational view of an exemplary platform that can be used to support an electrical signaling device like a video game controller.

Turning next to FIG. 8, which is a cross-sectional view of a preferred platform 26, it may be seen that the interior portion of the platform has deliberately been made rather thin. Such thinness in the interior of the platform means that a player who is holding the the combination of a platform and a video controller in his or her hands will notice relatively little difference in the "feel" of the combination—as compared with holding the controller alone. Therefore, those persons who have spent months or even years in developing a certain sensitivity to the way a controller "feels" will probably not notice much difference in the thickness of a controller that is supported by a platform 26. Also visible at the top of the platform 26 is a shallow cavity for receiving a metal anchor plate. The depth of the cavity is designed so that the top of the metal plate will be flush with the top of the molded plastic portion of the platform. A cloth cover or the like can then be permanently affixed to the top of the platform, to cover the top and to help ensure that the metal plate will never become separated from the plastic element.

If a person is in any way bothered by the presence of an exposed base 22 after the tube 32 has been removed, a cosmetic cover may be placed over the base using VELCRO TM fasteners or the like, so that no one would likely notice that there is anything special about the video rocker. The cosmetic cover, of course, would have on its exposed surface a material that matches the upholstery fabric of the video rocker. Alternatively, the base 24 may be connected to the structural frame of a chair before any cushioning or upholstery is added to the chair. A small aperture, just big enough to receive the pendant end of a tube 22, could then be placed in the upholstery at a location over the bore 36. In effect, the base could be buried inside a chair, with only a small aperture (about ⅜ inch in diameter) in the upholstery giving any outward clue that the chair could be used to support a video control platform. And a standard upholstery button (with a spring wire "clip") could even be placed in the bore 36 to conceal the aperture. At essentially any desired time, a person who owns the chair could install an apparatus 20 on the chair by merely engaging the complementary threads on the appropriate elements—without requiring the use of any exotic tools.

Once the apparatus 20 has been installed, a video game player need only place a controller on top of the platform and then pull or push the flexible tube 22 to a comfortable position for playing a desired game. If the player has had no experience with an apparatus 20, it will likely be advantageous to initially bend the tube 22 so that it forms a shape like an L. The lower part of the L will, of course, be next to the chair; and the top of the L will be connected to the platform 26. Next, the player will sit in the chair and then continue to bend the tube 221'if required—to put the controller in a desired position and/or give it a desired inclination to optimize the playing of a game. Some persons may even want to bend the flexible tube 22 into a supporting structure that more nearly resembles a C rather than an L. This is possible with the construction described herein, because a VELCRO TM fastener will preclude a controller from falling off the platform, even when the platform is not horizontal.

It should also be noted that the chair on which a person is sitting need not be a video chair; and the person using the apparatus 20 need not even be playing a video game. It would be reasonable for a person in a wheelchair to use the apparatus 20 to support a remote control device for controlling the operation of a television set, etc. So if some person were infirm or unable to effectively use a hand or an arm, etc., the apparatus 20 could be used effectively to support any control device at any height and angle to foster the sending of signals as the person pressed on appropriate switches.

While only the preferred embodiments of the invention have been disclosed herein in great detail, it should be apparent to those skilled in the art that modifications and variations in the structures could be made without departing from the general concept of the invention—as disclosed in the claims that follow. Also, it should be understood that the term "chair" has been used herein in a very general sense; by use of that term, it was not intended to narrowly cover only a four-legged sitting device for a single person. Hence, the term "chair" should be understood to encompass a bench, stool, rocker, sofa, loveseat or other structure upon which a person or persons can routinely sit. Therefore, the invention should be deemed to be measured by the claims appended hereto, with reference to only such descriptive words in this specification as is necessary.

What is claimed is:

1. An apparatus for supporting a manually-actuated control device for a video game, comprising:
   a. a manually-actuated control device for a video game, said control device being capable of generating video control signals in response to an application of manual forces by a player of a video game, and the application of manual forces by a player producing measurable torques that must be resisted in accordance with Newton's laws of motion so that the control device will remain sufficiently static as to be functional;
   b. a static structure having a floor;
   c. a chair-like structure that is designed to support a human in a seated position while the chair-like structure is supported by the static floor;
   d. a base and means for connecting the base to the chair-like structure;
   e. a platform having a top surface that is sized and configured to support the control device;
   f. means for releasably supporting the control device on the top surface of the platform, whereby the application of a manual force on the control device by a player of a video game will result in the transfer of that manual force to the platform; and
   g. elongated structural means for supporting the platform at a plurality of spatial positions relative to the base, said structural means having first and second ends, and the first end being connected to the base, and the second end being connected to the platform, and said elongated structural means being sufficiently stiff as to hold the platform in an essentially fixed position with respect to the base in response to the application of a manual force on the platform that produces a torque of less than six inch-pounds, such that a torque of at least six inch-pounds will be required in order to change the relative position of the platform with respect to the base, and said structural means for supporting the platform being sufficiently weak as to yield if and when the platform is even subjected to the application of a manual force on the platform that produces a torque of more than five foot-pounds, whereby said structural means will not constitute an object that is immovable as to reasonably be categorized as a safety hazard.

2. The apparatus as claimed in claim 1 wherein said elongated structural means for supporting the platform constitutes a flexible member that is capable of placing the platform in essentially an infinite number of possible positions with respect to the base.

3. The apparatus as claimed in claim 2 wherein the flexible member constitutes a coiled spring wrapped circumferentially with a metal wire in such as way as to form a tube-like combination, and the metal wire being wrapped so tightly around the coiled spring as to reliably hold the coiled spring in essentially any position into which a manual force may place it, even after said manual force has been removed.

4. The apparatus as claimed in claim 1 wherein the base is generally flat and has inner and outer surfaces, and the inner surface of the base is generally planar so that ti will rest in a particularly stable manner against a generally planar exterior surface of the chair-like structure to which the base is attached.

5. The apparatus as claimed in claim 1 wherein the base includes an inner part and an outer part, and the inner part is made of metal and is relatively strong, and the outer part is made of a moldable plastic material, and wherein said elongated structural means for supporting the platform includes a first end that is configured to engage the metal inner part of the base.

6. The apparatus as claimed in claim 1 wherein the elongate ed structural means for supporting a platform is selectively removable from and reconnectable to the base without disturbing the base, whereby the base may be removed from a chair-like structure without interfering with the ability of a user to selectively reconnect the base to the elongated structural means for supporting the platform.

7. The apparatus as claimed in claim 6 wherein the elongated structural means for supporting the platform is selectively connectable to and removable from the base with threaded members.

8. The apparatus as claimed in claim 1 wherein the elongated structural means for supporting the platform has identical male-type threaded connectors permanently affixed to each of its two ends, and wherein the base and the platform each have a threaded female-type connector that is compatible with the male-type connectors, whereby the respective ends of the elongated structural means for supporting the platform may be engaged with either the base of the platform.

9. An accessory for use by a person who is playing a video game associated with a video display, wherein the video game has certain preprogrammed instructions and provides for real-time input from a player, and wherein the player's input is accomplished by manipulating a control device that is designed to be hand-held, comprising:
   a. a control device for a video game, said control device being designed to be both hand-held and manipulated in order to generate input signal to an electronic device associated with the video game, and the input signals that are generated by the player being merged with certain preprogrammed operations derived from the video game, and wherein the player's normal manipulation of the control device involves the application of dynamic forces that must be resisted if the control device is to remain sufficiently static as to be functional, and said control device being connected for sending input signals to the video game;
   b. a chair-like structure adapted to rest above a floor, and the chair-like structure having a seat for supporting a human who is to play the video game;
   c. a base that is secured to the chair-like structure in order to be movable therewith;
   d. a platform having an upper and a lower surface;
   e. means for releasably supporting the control device on the upper surface of the platform; and
   f. structural means for supporting the platform with respect to the base in any chosen one of a plurality of possible positions, said structural means having sufficient stiffness as to resist displacement by the normal dynamic forces that are applied by a player when the player is manipulating a control device while playing the video game, whereby the platform may be manually moved to a desired position by the player, and whereby the platform will aid in supporting the control device at a chosen position where it is easy for the player to manipulate the control device.

10. The accessory as claimed in claim 9 wherein the structural means for supporting the platform with respect to the base constitutes a flexible tube having first and second ends with threaded members, and the first end being threadably attached to the base, and the second end being threadably attached to the platform.

11. The accessory as claimed in claim 10 wherein the flexible tube has a length of about 15 inches, such that the platform may be moved with respect to the chair-like structure in an arc having a radius of about 15 inches.

12. The accessory as claimed in claim 9 wherein the chair-like structure has a front, and the seat of the chair-like structure has a certain elevation above a supporting floor, and wherein the base is mounted on the front of the chair-like structure and below the elevation of the chair's seat above a supporting floor.

13. The accessory as claimed in claim 9 wherein the base is mounted at a location that lies in a generally vertical plane that passes centrally through the chair-like structure, and the mounting location for the base is generally below whereby a person sitting on the chair-like structure can place one leg to either side of the generally vertical plane and thereby straddle said structural means for supporting the platform.

* * * * *